US009651668B2

(12) United States Patent
Trilles

(10) Patent No.: US 9,651,668 B2
(45) Date of Patent: May 16, 2017

(54) METHOD AND SYSTEM FOR DETERMINING AN ERROR IN THE ESTIMATION OF THE TIME TAKEN TO CROSS THE IONOSPHERE

(71) Applicant: THALES, Neuilly-sur-Seine (FR)

(72) Inventor: Sebastien Trilles, Toulouse (FR)

(73) Assignee: THALES, Courbevoie (FR)

( * ) Notice: Subject to any disclaimer, the term of this patent is extended or adjusted under 35 U.S.C. 154(b) by 968 days.

(21) Appl. No.: 14/093,362

(22) Filed: Nov. 29, 2013

(65) Prior Publication Data

US 2014/0152497 A1   Jun. 5, 2014

(30) Foreign Application Priority Data

Nov. 30, 2012   (FR) ..................... 12 03245

(51) Int. Cl.
*G01S 19/13*   (2010.01)
*G01S 19/02*   (2010.01)
(Continued)

(52) U.S. Cl.
CPC .............. *G01S 19/13* (2013.01); *G01S 19/02* (2013.01); *G01S 19/07* (2013.01); *G01S 19/21* (2013.01); *G01S 19/40* (2013.01)

(58) Field of Classification Search
CPC .......... G01S 19/13; G01S 19/02; G01S 19/07; G01S 19/21; G01S 19/40
(Continued)

(56) References Cited

U.S. PATENT DOCUMENTS 7,629,923 B2 * 12/2009 Huang .................... G01S 19/41
342/357.43
8,344,946 B2 *  1/2013 Um ........................ G01S 19/07
342/357.58
(Continued)

FOREIGN PATENT DOCUMENTS

WO         99/18677 A1     4/1999

OTHER PUBLICATIONS

Niranjan Prasad, et al., "Preliminary Analysis of Grid Ionospheric vertical error for Gagan", GPS Solutions, Jun. 19, 2007, pp. 281-288, vol. 11, No. 4, Springer, Berlin, Germany, XP019546660.
(Continued)

*Primary Examiner* — Chuong P Nguyen
(74) *Attorney, Agent, or Firm* — BAKER HOSTETLER LLP

(57) ABSTRACT

A method for determining an error in the estimation of time taken to cross the ionosphere by a signal along a vertical sight axis associated with a receiver, the vertical sight axis cutting the ionosphere at a point of interest, the vertical sight axis being an axis passing through the receiver and a satellite of interest, comprises: determining at least two points of cutting of the ionosphere by two sight axes between a satellite and at least two ground stations; determining at least one angle formed by segments going from the point of interest to two of the cutting points; and determining the spatial dispersion of the cutting points with respect to the point of interest on the basis of the angle, by finding the difference with a predetermined angle and taking the average of the difference or differences.

8 Claims, 4 Drawing Sheets

(51) Int. Cl.
*G01S 19/07* (2010.01)
*G01S 19/21* (2010.01)
*G01S 19/40* (2010.01)

(58) Field of Classification Search
USPC ........................................ 342/357.44, 357.51
See application file for complete search history.

(56) References Cited

U.S. PATENT DOCUMENTS

| | | | |
|---|---|---|---|
| 9,395,443 B2* | 7/2016 | Trilles | G01S 19/21 |
| 2013/0002482 A1* | 1/2013 | Um | G01S 19/07 |
| | | | 342/357.27 |
| 2013/0127659 A1* | 5/2013 | Zhao | G01S 19/40 |
| | | | 342/357.23 |
| 2014/0163938 A1* | 6/2014 | Sparks | G06F 17/5009 |
| | | | 703/2 |
| 2014/0292573 A1* | 10/2014 | Drescher | G01S 19/13 |
| | | | 342/357.51 |
| 2015/0145722 A1* | 5/2015 | Johnson | G01S 19/07 |
| | | | 342/357.44 |
| 2016/0282472 A1* | 9/2016 | Jakowski | G01S 19/07 |

OTHER PUBLICATIONS

John C. Jubin, et al., "Wide-Area Differential GPS Reference-Station Placement", Position Location and Navigation Symposium, Apr. 22-26, 1996, pp. 503-514, IEEE, New York, NY, USA, XP010163317.

* cited by examiner

METHOD AND SYSTEM FOR DETERMINING AN ERROR IN THE ESTIMATION OF THE TIME TAKEN TO CROSS THE IONOSPHERE

CROSS-REFERENCE TO RELATED APPLICATION

This application claims priority to foreign French patent application No. FR 1203245, filed on Nov. 30, 2012, the disclosure of which is incorporated by reference in its entirety.

FIELD OF THE INVENTION

The present invention relates to the field of methods for estimating an error in the time of propagation of a signal (also known by the name "distance of the journey") between a satellite and a ground station or a satellite terminal. This propagation time is calculated by following an axis going from the satellite to the ground station or to the satellite terminal. This axis is also referred to as the line of sight or sight axis.

BACKGROUND

In satellite-based positioning systems, commonly referred to as GNSS, the acronym standing for Global Navigation Satellite System, a fixed or mobile satellite terminal such as a vehicle or an aircraft, is located by trilateration (trilateration is a mathematical procedure making it possible to determine the relative position of a point by using the geometry of triangles just like triangulation. But in contradistinction to the latter, which uses angles and distances to position a point, trilateration uses the distances between a minimum of two reference points) by means of the calculation of the distances separating it from several satellites. The precision in the evaluation of the distance between the satellite terminal or the ground station and each of the satellites is determinantal in obtaining precise positioning. The main source of error in the evaluation of this distance is the retardation accumulated by the signal when it passes through the ionosphere, where the partial ionization of the gases at high altitude disturbs the propagation of the signal and brings about a variable transmission delay.

In order to obtain a precise measurement of the positioning, it is therefore necessary to be able to procure an estimation of the time for the journey between the satellites and the ground station or the satellite terminal, as well as an estimation of the journey time estimation error. This is typically a fitted covariance. Accordingly, the known GNSS systems can be supplemented with so-called augmentation systems, which in real time deliver corrections connected with the activity of the ionosphere. These systems also deliver indicators of integrities guaranteeing these corrections. Augmentation systems based on satellites, commonly referred to as SBAS, signifying Satellite-Based Augmentation System, are known. Such is the case, for example, for the EGNOS system (for European Geostationary Navigation Overlay Service) used in Europe, which broadcasts from several geostationary satellites correction data destined for ground stations or satellite terminals using the GPS system (GPS signifying Global Positioning System).

In a known approach, commonly referred to as the TRIN model, the acronym standing for TRiangular INterpolation, the ionosphere is likened to a thin layer around the terrestrial globe, in which the entire electron charge of the ionosphere is accumulated. This thin layer is modeled by a linear model formed of a regular polyhedron, centered on the earth and possessing one thousand two hundred and eighty triangular faces.

Augmentation systems use interpolation procedures to determine the propagation delay of a signal passing through a determined penetration point. A penetration point is a point of the polyhedron situated at the intersection with the sight axis passing through the satellite and the satellite terminal or the ground station. The penetration point is commonly referred to as an IPP, the acronym standing for Ionosphere Pierce Point. The interpolation calculations are carried out on the basis of the knowledge of the retardations of the signals passing through nodes of the polyhedron close to the penetration point considered. In addition to the estimation of this propagation delay, an estimation of the impreciseness in this delay is carried out.

The estimation of the Vertical Total Electron Content, known by the acronym VTEC, makes it possible to establish an ionospheric chart of the retardations in the form of a spherical grid centered on the earth, situated at altitude and tied to the rotation of the earth. The nodes of the grid are dubbed IGP, the acronym standing for Ionospheric Grid Point. The systems known by the name SBAS broadcast to users the vertical ionospheric delays above the points of the grid, commonly referred to as an IONO grid, as well as reliability information to calculate the ionospheric retardation on the lines of sight of each satellite considered, by linear interpolation on this grid. A regular update of the values of the IONO grid, typically every 30 seconds, is broadcast by the systems known by the name SBAS destined for users of the navigation system.

This IONO grid which is accessible to users of navigation systems, is calculated by linear interpolation on the basis of the TRIN model at a fixed solar time, the exposure to the sun of each of the nodes of the polyhedron being constant.

This IONO grid therefore contains the necessary information regarding vertical delays which is required so that a user can reconstruct an estimation of the delay experienced by the signal during its crossing of the ionospheric layer. The method is known and standardized by the MOPS, the acronym standing for Minimum Operational Performance Standard. Knowing the vertical delay GIVD, the acronym standing for Grid Ionospheric Vertical Delay, and associated error GIVE, the acronym standing for Grid Ionospheric Vertical Error, for 4 points of the IGP grids, the user calculates, by linear interpolation the vertical delay at the pierce point IPP of the satellite-user sight axis, as well as the associated error UIVE, the acronym standing for User Ionospheric Vertical Error. Finally the user applies a mapping function (modeled and standardized by the MOPS) to pass from delays and errors vertically plumb with the point IPP to delays and errors along the sight axis at the same point IPP.

However the methods, known in the prior art, for determining this impreciseness are not precise enough to perform an effective check of the satellite-based augmentation system.

SUMMARY OF THE INVENTION

The invention is aimed at proposing an alternative solution for the estimation of the impreciseness in the propagation delay between a satellite and a satellite terminal or a ground station.

For this purpose, the subject of the invention is a method for determining an error in the estimation of the time taken to cross the ionosphere by a signal along a vertical sight axis, the vertical sight axis cutting the ionosphere at a point of interest, the vertical sight axis being an axis passing through the receiver and a satellite of interest. The method being characterized in that it comprises a first step 101 of determining at least two points of cutting of the ionosphere by two sight axes between a satellite and at least two ground stations or a ground station and at least two satellites. It also comprises a second step 102 of determining at least one angle formed by a segment going from the point of interest to one of the said cutting points and by a segment going from the point of interest to another of the said cutting points. It finally comprises a third step 103 of determining the spatial dispersion of the said cutting points with respect to the said point of interest on the basis of the said angle, by finding the difference with a predetermined angle and taking the average of the said difference or of the said differences. The method also comprises a fourth step 104 of determining an error in the estimation of the ionosphere crossing time by addition:

of a first error in the estimation of the crossing time dependent on a variance calculated by interpolation on the basis of a TRIN model, to a second error in the estimation of the crossing time dependent on the said spatial dispersion.

The method therefore consists in calculating an estimation of the error in estimating the vertical ionospheric delay at each point of the IONO IGP grid, in an adaptive manner as a function of the local ionospheric information, in such a way as to maximize service availability while guaranteeing integrity.

Advantageously the fourth determining step uses the relation:

$$GIVE = TGIVE + t(n)^2(\overline{UIVE} + k \cdot \sigma_p^2)$$

where GIVE is the said error in the estimation of the ionosphere crossing time,

TGIVE is the said first error $t(n)^2(\overline{UIVE} + k \cdot \sigma_p^2)$ is the said second error and is composed of:

$\sigma_p^2$ which is the said spatial dispersion, $t(n)^2$ which is the standard deviation of a Student's distribution with n degree of freedom, n being the number of the said cutting points that are used for the calculation of $\sigma_p^2$, $\overline{UIVE}$ which represents the average of the error in calculating the delay of the crossing of the ionosphere by a signal along the said two sight axes and k which is a coefficient making it possible to normalize $\sigma_p^2$.

The point by which the sight axis cuts the ionosphere is also referred to as an IGP point of interest of the broadcast IONO grid. The cutting points are also referred to as pierce point IPP, the acronym standing for Ionospheric Pierce Point.

The cutting points are situated in the neighbourhood of the point of interest.

The invention therefore makes it possible to estimate the impreciseness in the propagation delay between a satellite and a satellite terminal or a ground station by interpolation of the errors broadcast by the IONO grid.

Advantageously this method contributes to augmenting the monitoring of the IGP points of the IONO grid and therefore the service availability of an augmentation system of SBAS type. At the level of the user this method enables him to take into account a maximum number of lines of sight in the calculation of his point making it possible to thus reduce his location errors as well as the estimation of these errors.

Advantageously the method comprises a fourth step of determining a first distance between the point of interest and one of the cutting points and a second distance between the point of interest and another of the cutting points. Moreover the second step is adapted for the determination of the spatial dispersion on the basis furthermore of the first and second distances, by comparison with a predetermined distance and taking the average of the comparisons.

Advantageously the method comprises a fifth step of determining a first inclination of a first sight axis associated with one of the said cutting points with respect to a vertical axis and a second inclination of a second sight axis associated with another of the said cutting points. Moreover the second step is adapted for determining the spatial dispersion on the basis furthermore of the first and second inclinations.

Advantageously the predetermined angle is obtained as being an angle minimizing the error in the estimation of the crossing time.

Advantageously the predetermined angle is $2\pi/n$ with n the number of ionosphere cutting points.

Advantageously the predetermined distance is obtained as being a distance minimizing the error in the estimation of the crossing time.

The subject of the invention is also a system comprising a satellite and at least two ground stations implementing the method for determining an error in the estimation of the crossing time.

BRIEF DESCRIPTION OF THE DRAWINGS

The invention will be better understood and other advantages will become apparent on reading the detailed description of the modes of realization given by way of nonlimiting examples in the following figures.

DETAILED DESCRIPTION

The method of the invention makes it possible to determine the error in the time of propagation of a signal passing through a vertical sight axis cutting the ionosphere at a point referred to as a point of interest.

Figure 1:
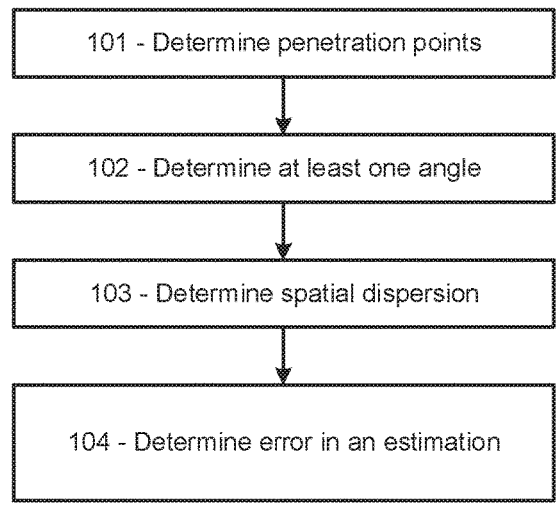
FIG. 1, presents the method according to one aspect of the invention.

The method such as presented in FIG. 1 comprises a first step 101 of determining at least two cutting points between the ionosphere, modeled by the surface of a polyhedron surrounding the Earth, and two different sight axes. These sight axes link a satellite and a ground station. Each of the two cutting or penetration points is respectively associated with a satellite and with a satellite terminal or with a ground station. Each penetration point is situated at the intersection between a sight axis of the satellite and the surface of the polyhedron. The satellite and/or the ground station are different for different sight axes. The method thereafter comprises a second step 102 of determining at least one angle formed by a segment going from the point of interest to one of the cutting points and by a segment going from the point of interest to another of the cutting points. Finally the method comprises a third step 103 of determining the spatial dispersion of the said cutting points on the basis of the said angle.

It is known that the estimation of the propagation delay associated with a point of the surface of the polyhedron known by the name IGP is obtained by linear interpolation of the propagation delays associated with the various penetration points (IPP). Moreover, ideally distributed points are defined as being points of the surface of the polyhedron for which this linear interpolation minimizes the error in estimating the propagation delay associated with this point. The geometric position achieving the minimum interpolation error is defined according to three types of parameters. The first type of parameter is the angle between the various penetration points and the ideal points. The second type of parameter is the distance between the various penetration points and the ideal points. The third type of parameter is the elevation (the elevation is defined as the angle between the sight axis and the vertical) of the lines of sight of the various penetration points and the comparison with a vertical elevation.

Figure 2:
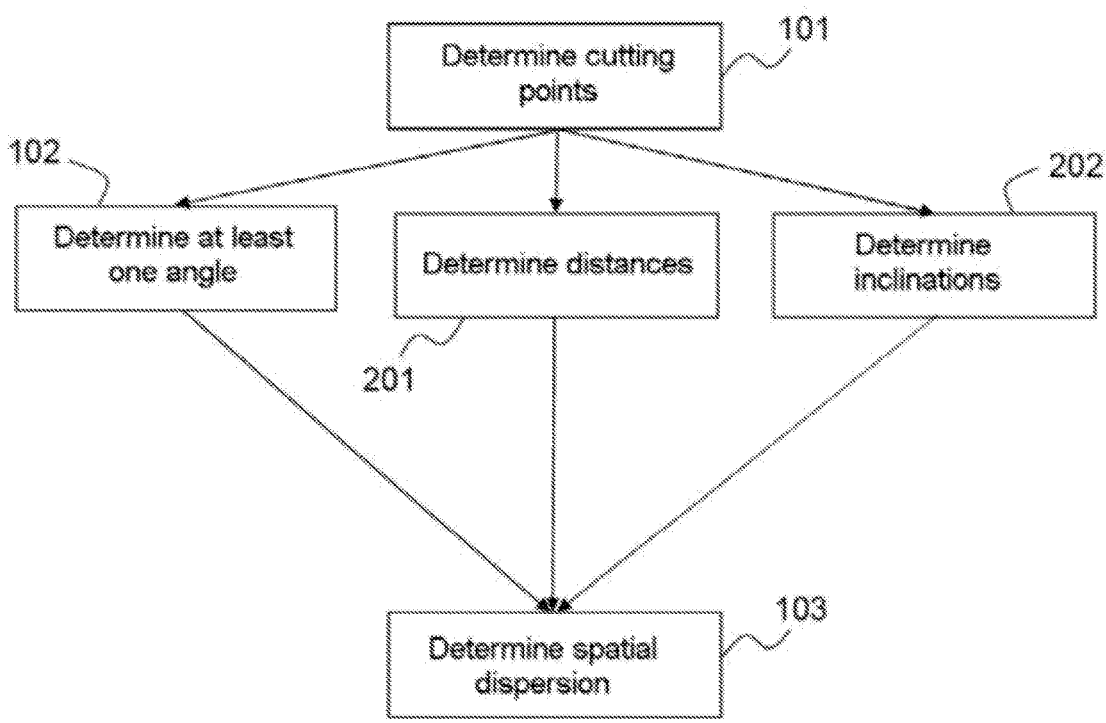
FIG. 2, presents the method according to a second aspect of the invention.

The method such as presented in FIG. 2 furthermore presents a fourth step 201 of determining a first distance between the point of interest and one of the cutting points and a second distance between the point of interest and another of the cutting points. The method as presented in FIG. 2 also presents a fifth step 202 of determining a first inclination of a first sight axis associated with one of the said cutting points and a second inclination of a second sight axis associated with another of the said cutting points. In certain modes of realization it is possible to perform just the fourth step 201 or just the fifth step 202. Finally the third step 103 is adapted for determining the spatial dispersion on the basis of the distances and/or of the inclinations.

In a first mode of realization, the calculation of the estimation of the impreciseness involves the calculation of the standard deviation denoted $\sigma_p$ which measures the spatial dispersion between the penetration points and the ideally distributed points of the ionosphere so as to minimize the error in estimating the propagation time.

Figure 3:
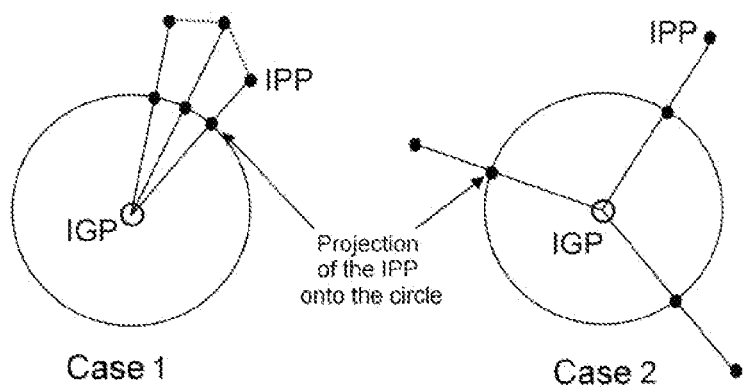
FIG. 3 presents two examples of projection of the penetration points onto a circle containing the ideal points.
Figure 4:
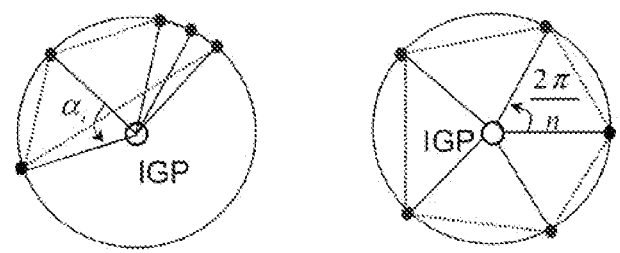
FIG. 4 presents on the left, an example of projection of five penetration points and, on the right, an example of five points belonging to a set of ideally distributed points.

The ideally distributed points are so distributed on a unit circle whose centre is the point of interest and whose radius is determined. These points are separated by an angle of $2\pi/n$ where n is the number of points. The penetration points (IPP) are projected onto the circle containing the ideally distributed points. FIG. 3 presents two examples of this projection. FIG. 4 presents, on the left, an example of projection of five penetration points and on the right an example of five ideally distributed points. In the case of FIG. 4, the projected points are separated by an angle denoted $\alpha_i$ and the ideal points are separated by an angle $2\pi/5$.

In the case, the standard deviation denoted $\sigma_p$ is obtained as being the average, of the difference squared between:
the angles $\alpha_i$ expressed in radiant of the projected points and
the angles $2\pi/n$ expressed in radiant of the ideally distributed points.

$$\sigma_P^2 = \frac{c}{\pi^2} E\left[\left(\frac{2\pi}{n} - \alpha_i\right)^2\right]$$

E[ ] represents the mathematical expectation.

In this equation, c is a configuration parameter making it possible to adjust the weight of the angular dispersion measurement in the estimation of the propagation delay calculation error. This parameter is defined by adjustment on the basis of real data as a function of the minimum protection volume that the SBAS system chooses to broadcast.

In order to simplify the calculation of the average, it is possible to disregard the contribution of the last angle $\alpha_n$. Indeed the value of this angle is contained in the other angles through the formula $\alpha_n = 2\pi - \alpha_1 - \ldots - \alpha_{n-1}$. The formula for the standard deviation is then:

$$\sigma_p^2 = \frac{c}{\pi^2} \frac{1}{n-1} \sum_{i=1}^{n-1} \left(\frac{2\pi}{n} - \alpha_i\right)^2$$

The value of this standard deviation is bounded by a finite value whatever the number of penetration points. Moreover, it equals zero when the penetration points coincide with an ideal configuration. On the other hand, in the case where the penetration points are in the poorest configuration (this is the case when all the penetration points coincide at one and the same point), the standard deviation equals $$\frac{1}{\sqrt{n}}.$$

In addition to taking account of the angular dispersion, it is possible to take account of the dispersion in distance of the penetration points with respect to the point of interest.

Figure 5:
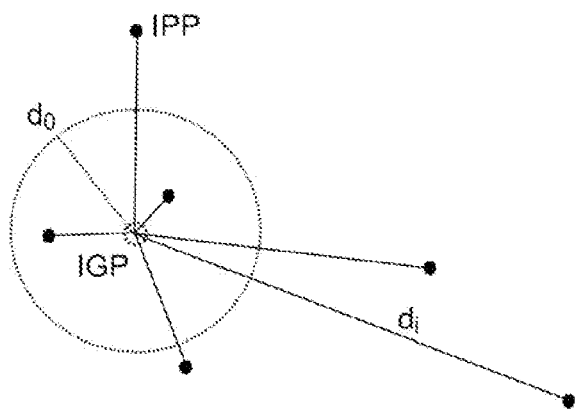
FIG. 5 presents the distance $d_0$.

To achieve this, it is possible to add a factor into the expression for the standard deviation. Accordingly, the pierce points situated beyond a distance $d_0$ from the IGP point of interest are considered. Short of this distance the IPP points are considered to be sufficiently close to allow a relevant taxonomy. Typically the distance $d_0$, such as represented in FIG. 5, corresponds to the base of a cone of aperture 3.5°, 5°, etc., makes it possible to define the points which are taken into account in the calculation of the spatial dispersion.

The parameter defining the spatial dispersion is then:

$$S = cE\left[\left(\frac{d_i \chi(d_i, d_0)}{d_0}\right)^2\right] = \frac{c}{n} \sum_{i=1}^{n} \left(\frac{d_i \chi(d_i, d_0)}{d_0}\right)^2$$

In this equation $d_i$ is the spherical distance between the penetration point i and the point of interest of the polyhedron, c is a configuration parameter making it possible to adjust the weight of the spatial dispersion measurement in the estimation of the propagation delay calculation error, n is the number of interception points considered and $\chi(d_i, d_0)$ is an integer defined thus:

$$\begin{cases} \chi(d_i, d_0) = 1 \text{ if } d_i > d_0 \\ \chi(d_i, d_0) = 0 \text{ if } d_i \le d_0 \end{cases}$$

The standard deviation $\sigma_p$ is then defined in the following manner:

$$\sigma_p^2 = \beta \frac{c}{\pi^2} E\left[\left(\frac{2\pi}{n} - \alpha_i\right)^2\right] + (1-\beta)S$$

In this equation, $\beta$ is an adjustment parameter (lying between 0 and 1) making it possible to choose to favour one or the other term of the equation.

Figure 6:
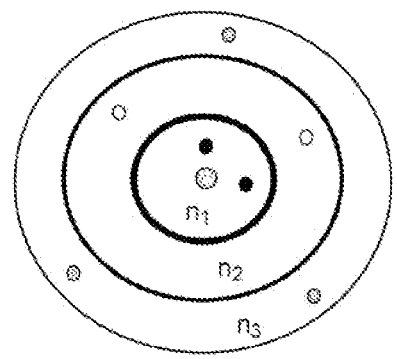
FIG. 6 presents the zone around the point of interest, separated into K contiguous annuli.

In a second mode of calculation of the dispersion in distance of the penetration points with respect to the point of interest, the penetration points are classed as a function of their distance from the point of interest. The zone around the point of interest is separated into K contiguous annuli such as represented in FIG. 6. In each zone the distances between the point of interest and the penetration points are correlated. With each annulus k is associated a weighting coefficient denoted $w_k$, and a number of penetration points, denoted $n_k$. The total number of penetration points taken into account is then $=\Sigma_{k=1}^K n_k$. The coefficients $w_k$ are defined according to a decreasing numerical law, which is a maximum on the disc containing the IGP point of interest and a minimum outside the last annulus.

In this case the parameter defining the spatial dispersion is obtained by virtue of the equation:

$$S = -\frac{c}{W} \sum_{i=1}^{K} w_k \frac{n_k}{N} \ln \frac{n_k}{N} \text{ with } W = \sum_{k=1}^{K} w_k$$

The result of this equation is dimensionally equivalent to an entropy. This equation is obtained on the basis of the discretization of the following general equation:

$$S = -\frac{c}{W} \int_I w(x)p(x)\ln(p(x))dx \text{ with } W = \int_I w(x)dx$$

In this equation, $p(x)$ is the probability density of having a penetration point in the annulus situated at a distance lying between $x$ and $x+dx$ from the point of interest.

It is moreover possible to take into account the inclination of the sight axis associated with a penetration point. In this case an obliquity factor F of the sight axis is defined by:

$$F(El) = \left(1 - \left(\frac{R_e \cos El}{R_e + h}\right)\right)^{-\frac{1}{2}}$$

Figure 7:
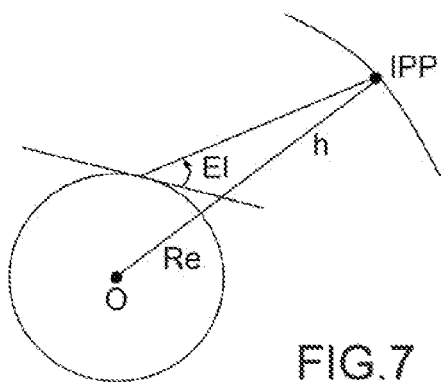
FIG. 7 presents the inclination of the sight axes.

In this equation El is the elevation of the journey, $R_e$ is the radius of the earth and h the height of the ionosphere. These various elements are presented in FIG. 7.

This obliquity factor makes it possible to effect the correspondence between the journey time in the case of a vertical axis and the journey time in the case of an inclined axis. The principle is therefore to consider that the journeys with a vertical axis are the journeys for which the calculation of the duration is the best. Indeed the calculation of the journey duration makes the assumption of a slender ionospheric layer, this assumption therefore causes an error in the case where the axis of the journey is inclined.

The standard deviation is therefore augmented by the following factor;

$$f = \frac{c}{W} \sum_{i=1}^{n} \nabla F(El_i)^2 (F(El) - 1)^2 \text{ with } W = \sum \nabla F(El_i)^2$$

In this equation c is a configuration parameter making it possible to adjust the weight of the obliquity dispersion measurement in the estimation of the propagation delay calculation error and $\nabla F(El_i)$ represents the laplacian function of the obliquity factor. This laplacian function represents the measurement of the difference between the value of the obliquity factor F at any penetration point and the mean value of the obliquity factor F in the neighbourhood of a penetration point. This term therefore makes it possible to model the variation in the obliquity factor in proximity to a point of the polyhedron defined in respect of its elevation.

The standard deviation, denoted $\sigma_p$, taking into account the obliquity criterion is therefore defined by;

$$\sigma_p^2 = \frac{(1 - \beta_1 - \beta_2)c}{n\pi^2} \sum_{i=1}^{n} \left(\frac{2\pi}{n} - \alpha_i\right)^2 + \beta_1 S + \beta_2 f$$

The coefficients $\beta_i$ are chosen in such a way that $\Sigma \beta_i = 1$.

In a second mode of realization, the calculation of the estimation of the impreciseness involves the calculation of the standard deviation denoted $\sigma_p$ which measures the spatial dispersion between the penetration points and the ideally distributed points. These points are situated at a determined distance from the point of interest.

In this case the standard deviation is of the form:

$$\sigma_p^2 = \frac{1}{W} \frac{c}{\pi^2} \sum_{i=1}^{n} w_i \left(\frac{2\pi}{n} - \alpha_i\right)^2 \text{ with } W = \sum_{i=1}^{n} w_i$$

A weighting coefficient $w_i$ has therefore been added, for each point i. These weightings $w_i$ can be derived from an a priori function consisting of the ionospheric spatial correlation, divided by the standard deviation of the vertical delay associated with the penetration point. This weighting is of the form:

$$w_i = \sigma^j e^{a\left(\frac{d_i}{d_0}\right)^2}$$

In this equation $d_i$ is the spherical distance between the penetration point i and the point of interest, n is the total number of penetration points, a and $d_0$ are configuration parameters. This equation therefore gives a high weight to a penetration point far from the point of interest.

Another definition of the weightings is the following, this definition gives a less significant weighting factor;

$$w_i = a\sigma_i\left(\frac{d_i}{d_0}\right)^2$$

The standard deviation $\sigma_i$ represents the noise of the measurement seen as an uncorrelated distribution of white noise.

In the case of these ideally distributed points, it is also possible to take into account the inclination of the sight axis associated with a penetration point. Accordingly, it is possible to increment the weighting factors $w_i$ so as to take account of the angle of elevation of the sight axis. The weighting factors are therefore modified in the following manner:

$$w_i = \sigma_i e^{a\left(\frac{d_i}{d_0}\right)^2} + bF(El)\nabla F(El_i)^2$$

The value representative of the impreciseness in the propagation delay associated with an IGP point of interest is then given by the following formula:

$$\text{GIVE} = T\text{GIVE} + t(n)^2(\overline{\text{UIVE}} + k \cdot \sigma_p^2)$$

In this equation, GIVE is the ionospheric delay impreciseness error (the acronym standing for Grid Ionospheric Vertical Error), TGIVE is the variance calculated by interpolation on the basis of the TRIN model and of the associated filtering, $t(n)^2$ is the standard deviation of a Student's distribution with n degree of freedom, n being the number of pierce points IPP that are used for the calculation of $\sigma_p^2$, $\overline{\text{UIVE}}$ represents the average of the error in calculating the ionospheric delay on each pierce point IPP, k is a coefficient making it possible to normalize $\sigma_p^2$.

The person skilled in the art knows how to calculate the values TGIVE and UIVE, he can in particular refer to the document "Preliminary analysis of grid ionospheric vertical error for GAGAN" by Niranjan Prasad published in GPS SOLUTIONS, SPRINGER, BERLIN, Del., volume 11, number. 4, 19 Jun. 2007, pages 281-288, which describes a mode of calculation of these parameters.

The person skilled in the art also knows to use the document "A New Method for Monitoring the Earth's Ionospheric Total Electron Content Using the GPS Global Network" by A. J. Mannucci, B. D. Wilson, C. D. Edwards and published during the ION GPS-93 conference.

This document presents the TRIN solution, the acronym standing for TRiangular INterpolation in order to estimate the electron content of the ionosphere and the location of the electron content with the aid of the measurement of double frequencies gathered by a set of stations or detection sensors. In this procedure, the ionosphere is considered to be a thin layer, in which the whole of the ionosphere retardation of the signal is accumulated. This thin layer makes it possible to consider that the quantity of retardation perceived by a signal depends only on the TEC at the site where it pierces the thin layer of the ionosphere, this point is referred to as an ionosphere pierce point (IPP). The typical quantity for describing the retardation at an IPP is the delay that the vertical signal would build up at this point. This is related to the vertical TEC (VTEC), that is to say the integral of the electron density integrated ionosphere along the vertical trajectory of the signal in the ionosphere.

Figure 8:
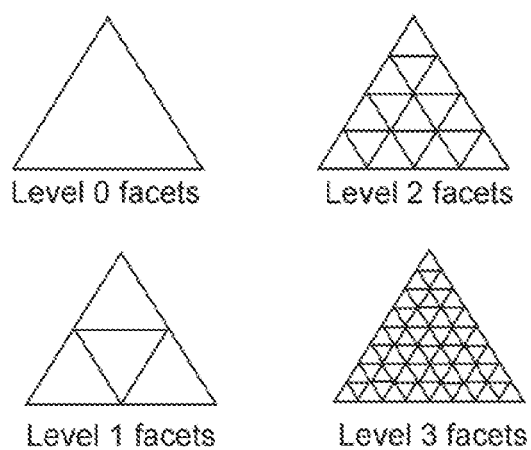
FIG. 8 presents a triangular mesh.

This method models the presumed slender ionospheric layer by a polytope approximation. The model is constructed using a basic regular polyhedron which is refined by successive subdivision (a new vertex is placed in the middle of each edge) such as is represented in FIG. 8. It is also fixed with respect to a solar system, which is a magnetic datum, of such sort each vertex is at a constant solar time.

Figure 9:
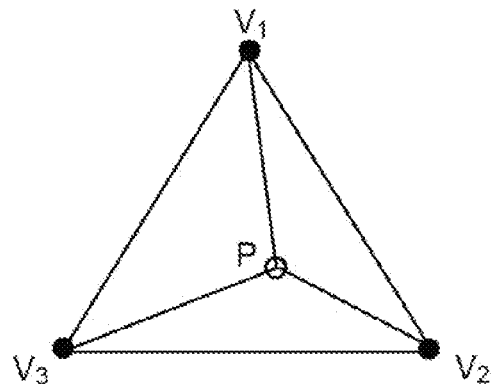
FIG. 9 presents a mode of realization of the calculation of VTEC.

The estimation of the VTEC on each vertex of the grid of the TRIN model, such as defined previously, is done by in real time by a conventional fitting method (Kalman type) The measurements which feed of the fitting filter are determined on the basis of the VTEC value associated with a pierce point IPP. These measurements are constructed mathematically as the equation of weighted linear interpolation of each IPP (point P) with three vertices of the triangle containing the point IPP (v1, v2, v3), see FIG. 9. These measurements are therefore determined using the relation $\text{VTEC}_p = w_1 \cdot \text{VTEC}_{v1} + w_2 \cdot \text{VTEC}_{v2} + w_3 \cdot \text{VTEC}_{v3}$. In this relation $\text{VTEC}_p$ represents the (known) VTEC of the point P, $\text{VTEC}_{vi}$ represents the VTEC at the point vi that needs to be fitted and $w_i$ represents the weighting coefficient at the point vi.

The unknown values are therefore $\text{VTEC}_{vi}$ associated with each vertex. The filtering process (for example a Kalman filter) adapts the values $\text{VTEC}_{vi}$ using the relation $\text{VTEC}_p = w_1 \cdot \text{VTEC}_{v1} + w_2 \cdot \text{VTEC}_{v2} + w_3 \cdot \text{VTEC}_{v3}$. This relation is implemented for each point P where the VTEC is measured. The outputs of the filters are the pair consisting of the value of the VTEC and the variance of the VTEC for each vertex vi of the polyhedron.

Figure 10:
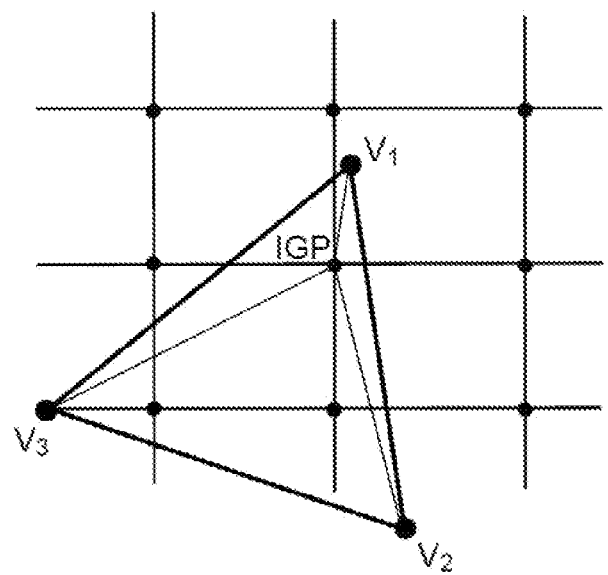
FIG. 10 presents another mode of realization of the calculation of VTEC.

In a second step for each of the points of the grid (IGP) of the grid, the conventional TRIN procedure makes it possible to calculate a mean value weighted with the aid of the three estimated VTEC values close to the grid. The linear interpolation formula is the relation $\text{VTEC}_p = w_1 \cdot \text{VTEC}_{v1} + w_2 \cdot \text{VTEC}_{v2} + w_3 \cdot \text{VTEC}_{v3}$ where the variables $\text{VTEC}_{vi}$ are now known. This is therefore the process which is inverse to the first step. The outputs of the filters are the pair consisting of the value of the VTEC and the variance of the VTEC for each vertex for each IGP of the grid. The value of the variance of the VTEC associated with an IGP is denoted TGIVE_basic. This is in particular presented in FIG. 10.

Thus it is possible to increment the TGIVE_basic of the basic variance of any one of the IGP points with local information introduced by a point IPP, so as to avoid the overly optimistic estimation arising from global TRIN model. This makes it possible to guarantee integrity of the ionospheric correction for each point of the grid.

The invention claimed is:

1. A method for determining an error in an estimation of time taken to cross the ionosphere by a signal along a vertical sight axis associated with a receiver, the said vertical sight axis cutting the ionosphere at a point of interest, the vertical sight axis being an axis passing through the receiver and a satellite of interest, the method implementing an error determination system configured to augment a Satellite-Based Augmentation System, the method comprising:
   a first step of determining with the error determination system at least two points of cutting of the ionosphere by two sight axes between a satellite and at least two ground stations or a ground station and at least two satellites;
   a second step of determining with the error determination system at least one angle formed by a segment going from the said point of interest to one of the said cutting points and by a segment going from the said point of interest to another one of the said cutting points;
   a third step of determining with the error determination system a spatial dispersion of the said cutting points with respect to the said point of interest on a basis of the said angle, by finding a difference with a predetermined angle and taking an average of the said difference;

a fourth step of determining with the error determination system an error in the estimation of the ionosphere crossing time by addition:

of a first error in the estimation of the crossing time dependent on a variance calculated by interpolation on a basis of a triangular interpolation (TRIN) model, to a second error in the estimation of the crossing time dependent on the said spatial dispersion, wherein the error in the estimation of the ionosphere crossing time is utilized to augment the Satellite-Based Augmentation System.

2. The determining method according to claim 1, in which the said fourth determining step uses the relation:

$$\text{GIVE} = T\text{GIVE} + t(n)^2(\overline{\text{UIVE}} + k \cdot \sigma_p^2)$$

where GIVE is the said error in the estimation of the ionosphere crossing time,

TGIVE is the said first error, $t(n)^2(\overline{\text{UIVE}} + k \cdot \sigma_p^2)$ is the said second error and is composed of:

$\sigma_p^2$ is the said spatial dispersion, $t(n)^2$ is the standard deviation of a Student's distribution with n degree of freedom, n being the number of the said cutting points that are used for the calculation of $\sigma_p^2$, $\overline{\text{UIVE}}$ represents the average of the error in calculating the delay of the crossing of the ionosphere by a signal along the said two sight axes and k is a coefficient making it possible to normalize $\sigma_p^2$.

3. The determining method according to claim 1, further comprising:

determining a first distance between the said point of interest and one of the said cutting points and a second distance between the said point of interest and another of the said cutting points and in which the said third step further comprises determining the said spatial dispersion on a basis furthermore of the said first and second distances, by comparison with a predetermined distance and by taking an average of the said comparison.

4. The determining method according to claim 3, in which the said predetermined angle is obtained as being an angle minimizing the error in the estimation of the crossing time.

5. The determining method according to claim 1, further comprising:

a fifth step of determining a first inclination of a first sight axis associated with one of the said cutting points with respect to a vertical axis and a second inclination of a second sight axis associated with another of the said cutting points, and the said second step further comprising determining the said spatial dispersion on the basis furthermore of the said first and second inclinations.

6. The determining method according to claim 1, in which the said predetermined angle is $$\frac{2\pi}{n}$$

with n being a number of the said ionosphere cutting points.

7. The determining method according to claim 1, wherein a predetermined distance is obtained as being a distance minimizing the error in the estimation of the crossing time.

8. A system comprising a satellite and at least two ground stations implementing the method according to claim 1.

* * * * *